US007621680B2

(12) United States Patent
Frick et al.

(10) Patent No.: US 7,621,680 B2
(45) Date of Patent: Nov. 24, 2009

(54) IN-CEILING SURVEILLANCE HOUSING

(75) Inventors: William C Frick, Lancaster, PA (US); Kathleen E Arnold, York, PA (US); Theodore L Jones, Akron, PA (US)

(73) Assignee: Robert Bosch GmbH, Stuttgart (DE)

( * ) Notice: Subject to any disclaimer, the term of this patent is extended or adjusted under 35 U.S.C. 154(b) by 514 days.

(21) Appl. No.: 11/295,093

(22) Filed: Dec. 6, 2005

(65) Prior Publication Data

US 2007/0127911 A1 Jun. 7, 2007

(51) Int. Cl.
*G03B 17/00* (2006.01)

(52) U.S. Cl. ....................... 396/419; 396/433; 403/321; 348/143

(58) Field of Classification Search ................. 348/373, 348/374, 73, 143, 151, 152; 396/419; 269/32
See application file for complete search history.

(56) References Cited

U.S. PATENT DOCUMENTS 2,973,177 A 2/1961 Stubbs
3,018,082 A 1/1962 Berger
3,388,247 A 6/1968 Rackley
3,712,571 A 1/1973 Miller et al.
3,732,368 A 5/1973 Mahlab
4,048,491 A 9/1977 Wessman
4,341,452 A 7/1982 Korling
4,414,576 A * 11/1983 Randmae .................... 348/373
4,653,709 A 3/1987 Paldino
5,028,997 A 7/1991 Elberbaum
5,318,257 A 6/1994 Tani
5,394,209 A 2/1995 Stiepel et al.
5,598,207 A 1/1997 Kormos et al.
5,649,255 A * 7/1997 Schieltz ...................... 396/427
5,905,923 A 5/1999 Chitsaz et al.
5,924,790 A * 7/1999 Ponton et al. ............... 362/370
5,964,523 A 10/1999 Eversberg
5,967,640 A 10/1999 Moriyama et al.
6,045,241 A * 4/2000 Pahl ........................... 362/365
6,095,660 A 8/2000 Moriyama et al.
6,234,691 B1 5/2001 Jones et al.
6,268,882 B1 7/2001 Elberbaum
6,320,608 B1 * 11/2001 Yap et al. ...................... 348/73
6,715,940 B2 4/2004 Top et al.

(Continued)

FOREIGN PATENT DOCUMENTS

EP 0810791 A2 12/1997

(Continued)

*Primary Examiner*—Patrick J Assouad
*Assistant Examiner*—Linda B Smith
(74) *Attorney, Agent, or Firm*—Baker & Daniels LLP

(57) ABSTRACT

A clamp mechanism for securing an in-ceiling surveillance camera housing assembly to a ceiling. The clamping mechanism advantageously allows easy installation of the camera housing in the ceiling via a camera housing aperture without requiring a large access aperture adjacent the camera housing aperture. The clamping mechanism also allows easy removal of the housing if, for some reason, the housing must be removed because the clamping mechanism is bidirectional and may be stowed within a groove on an outer surface of the housing. Once the clamping mechanism lowers a clamp to secure the housing assembly to the ceiling, a window and trim ring assembly is locked to the housing assembly to discourage removal of the window and trim ring assembly and prevent access to the clamping mechanism.

27 Claims, 7 Drawing Sheets

U.S. PATENT DOCUMENTS

| | | | |
|---|---|---|---|
| 6,752,520 | B2 | 6/2004 | Vernusset et al. |
| 6,781,753 | B2 * | 8/2004 | Gunderson .................. 359/393 |
| 6,896,423 | B2 * | 5/2005 | Arbuckle et al. ............ 396/427 |
| 7,173,195 | B2 * | 2/2007 | Michaud ..................... 174/653 |
| 2002/0044214 | A1 | 4/2002 | Hovanky |
| 2002/0130230 | A1 | 9/2002 | Ursan et al. |
| 2003/0103161 | A1 | 6/2003 | Tatewaki et al. |
| 2006/0239677 | A1 | 10/2006 | Friedrich |

FOREIGN PATENT DOCUMENTS

| | | | |
|---|---|---|---|
| EP | 1380793 | A2 | 1/2004 |
| JP | 2005184432 | A | 7/2005 |
| JP | 2006222610 | A | 8/2007 |
| WO | WO 99/66472 | A1 | 12/1999 |

* cited by examiner

IN-CEILING SURVEILLANCE HOUSING

BACKGROUND OF THE INVENTION

1. Field of the Invention

The present invention relates to an in-ceiling surveillance housing, and, more particularly, to a clamping mechanism for use with an in-ceiling surveillance housing.

2. Description of the Related Art

A typical surveillance camera assembly is used in many applications. One example of a typical installation is an in-ceiling surveillance camera housing assembly, i.e., a backbox assembly, where the assembly is secured in a ceiling structure. The environment in which in-ceiling surveillance housings are employed make ease of installation critically important to disguise the electrical and mechanical installation of the housing. The in-ceiling surveillance housing must be properly mechanically and electrically connected to the ceiling structure.

Prior art mechanical connections for in-ceiling surveillance housings typically require an additional access point beyond that prepared for acceptance of the housing itself. For example, an installer either must form another hole in the ceiling structure to gain access to electrical or mechanical connections above the ceiling structure. Alternatively, the installer must have access to a top side of the ceiling structure, for example, in a drop ceiling configuration, to install the necessary securing structure.

Some mechanical connection designs, i.e., clamping mechanisms, used to secure the housings in the ceiling structures do not require an additional access point. However, these designs require the clamping mechanism to be disassembled from the housing if, for some reason, the housing must be removed from the ceiling structure. Moreover, the clamping mechanism is typically unidirectional, i.e., once it is tightened down onto a ceiling structure, it cannot be loosened in the same manner as it was tightened. Thus, an additional access point may be required to remove the housing from the ceiling structure.

Additionally, typical in-ceiling surveillance housings require removal of the camera from the housing during wiring of the assembly. The installer may need access to wiring connections inside the housing and then would insert the camera into the housing and connect the camera after installing the housing in the ceiling structure. Disadvantageously, such an installation poses logistical problems for the installer and also exposes the camera to an additional risk of damage.

Furthermore, typical in-ceiling surveillance housing assemblies include a window and trim ring assembly which is assembled to the surveillance housing assembly after the housing is installed in the ceiling structure and the camera is connected to the housing. A typical window and trim ring assembly is easily installed by, for example, a bayonet-type engagement interface or with a stud and mating clip arrangement. However, typical window and trim ring assemblies are not tamperproof and generally have no ability to resist entry into the housing assembly by unauthorized persons.

What is needed in the art is an in-ceiling surveillance housing assembly which does not exhibit the above-identified problems.

SUMMARY OF THE INVENTION

The present invention provides a clamp mechanism for securing an in-ceiling surveillance camera housing assembly to a ceiling. The clamping mechanism advantageously allows easy installation of the camera housing in the ceiling via a camera housing aperture without requiring a large access aperture adjacent the camera housing aperture. The clamping mechanism also allows easy removal of the housing if, for some reason, the housing must be removed because the clamping mechanism is bidirectional and may be stowed within a groove on an outer surface of the housing. Once the clamping mechanism lowers a clamp to secure the housing assembly to the ceiling, a window and trim ring assembly is locked to the housing assembly to discourage removal of the window and trim ring assembly and prevent access to the clamping mechanism.

The invention comprises, in one form thereof, a clamping mechanism for securing a surveillance camera housing assembly to a ceiling structure, the surveillance camera housing assembly including a housing, the clamping mechanism including a bracket, the bracket including a guide slot; a clamp, the clamp including a follower pin, the follower pin engageable with the guide slot; and a drive member, the drive member engaged with the clamp; wherein the bracket is attached to the housing; wherein upon rotation of the drive member, the follower pin of the clamp follows the guide slot of the bracket.

The invention comprises, in another form thereof, a surveillance camera housing assembly for mounting in a ceiling structure, including a housing including a clamping mechanism, the clamping mechanism including a bracket, the bracket including a guide slot; a clamp, the clamp including a follower pin, the follower pin engageable with the guide slot; and a drive member, the drive member engaged with the clamp; wherein the bracket is attached to the housing; wherein upon rotation of the drive member, the follower pin of the clamp follows the guide slot of the bracket. The surveillance camera housing assembly also includes a camera, the camera removably connected to the housing; and a window assembly removably connected to the housing.

The invention comprises, in yet another form thereof, a method for installing a surveillance camera housing assembly to a ceiling structure, including the steps of inserting a housing with attached clamping mechanism into the ceiling structure, the clamping mechanism including a bracket, the bracket including a guide slot; a clamp, the clamp including a follower pin, the follower pin engageable with the guide slot; and a drive member, the drive member engaged with the clamp; wherein the bracket is attached to the housing; wherein upon rotation of the drive member, the follower pin of the clamp follows the guide slot of the bracket; rotating the drive member in a first direction until the clamp engages the ceiling structure; and connecting a window assembly to the housing.

An advantage of the present invention is that the camera housing assembly may be installed through a single aperture in the ceiling.

Another advantage is that the housing assembly may be efficiently removed from the ceiling structure because the clamping mechanism is bidirectional and stowable on an outer surface of the housing. Thus, the clamping mechanism may be reusable.

Still another advantage is that the clamping mechanism is easy to operate to secure the housing to the ceiling structure.

Yet another advantage is that the window and trim ring assembly discourages easy removal of the window and trim ring assembly and therefore prevents access to the clamping mechanism.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
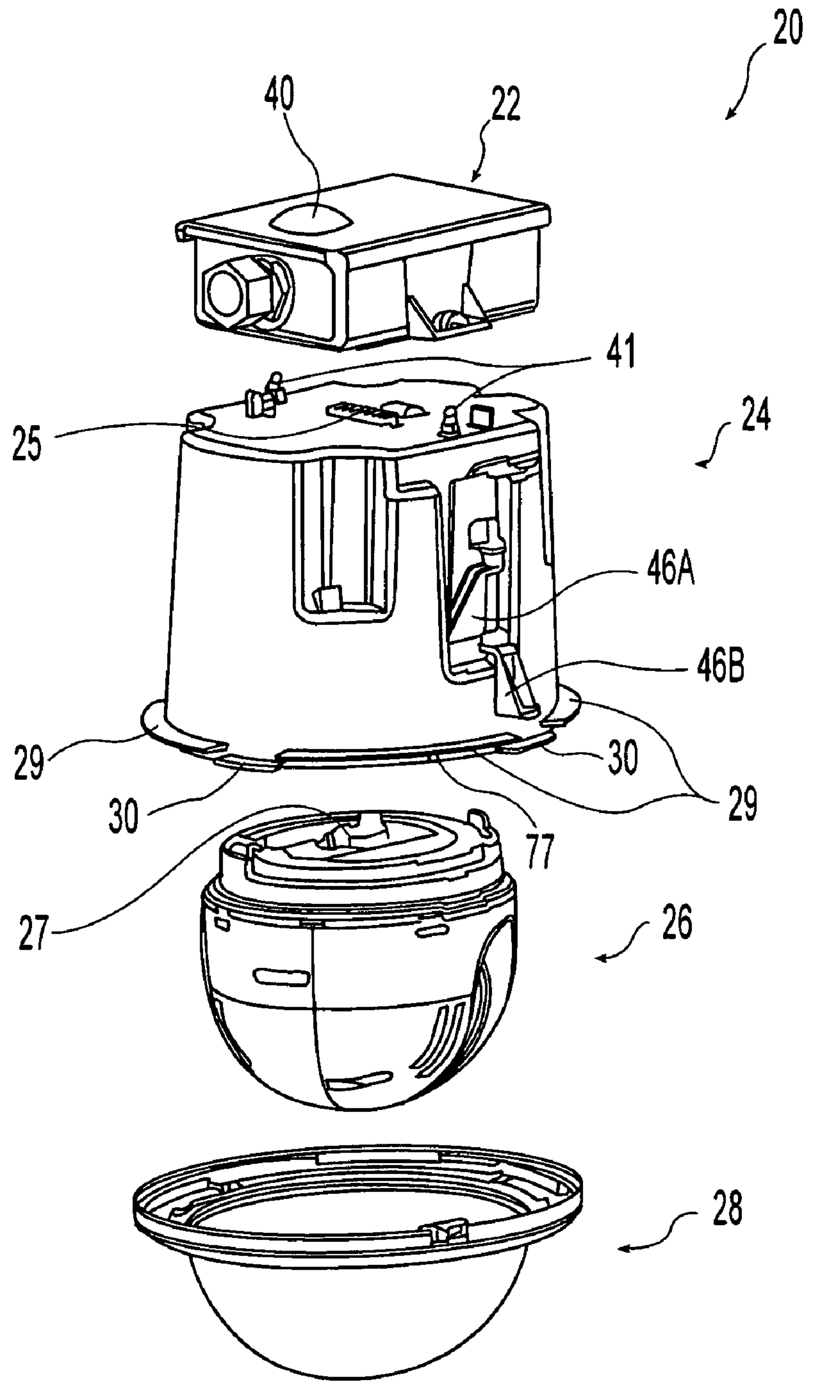
FIG. 1 is an exploded perspective view of an in-ceiling surveillance camera housing assembly.

Corresponding reference characters indicate corresponding parts throughout the several views. Although the exemplifications set out herein illustrate the invention, in one form, the embodiments disclosed below are not intended to be exhaustive or to be construed as limiting the scope of the invention to the precise form disclosed.

DESCRIPTION OF THE PRESENT INVENTION

Referring now to the drawings, and particularly to FIG. 1, surveillance camera housing assembly 20 is shown including interface box 22, housing 24, camera 26, and window assembly 28. FIG. 1 also shows clamp 46 in a retracted position, denoted by clamp 46A, and a clamping position, denoted by clamp 46B, the details of which are described below.

Figure 2:
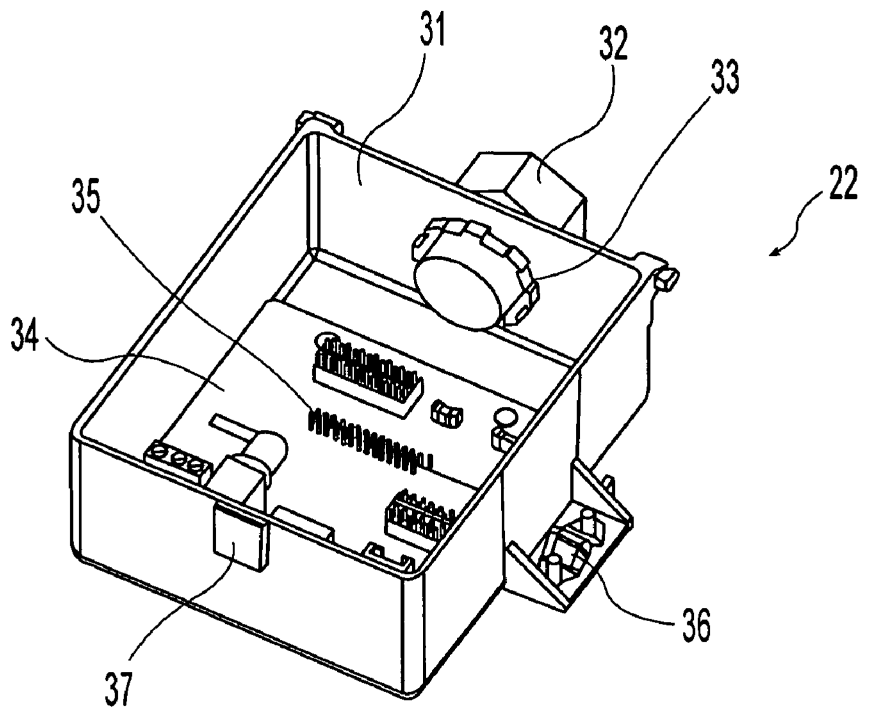
FIG. 2 is a perspective view of a portion of the housing assembly of FIG. 1, further illustrating an inner portion of an interface module.
Figure 3:
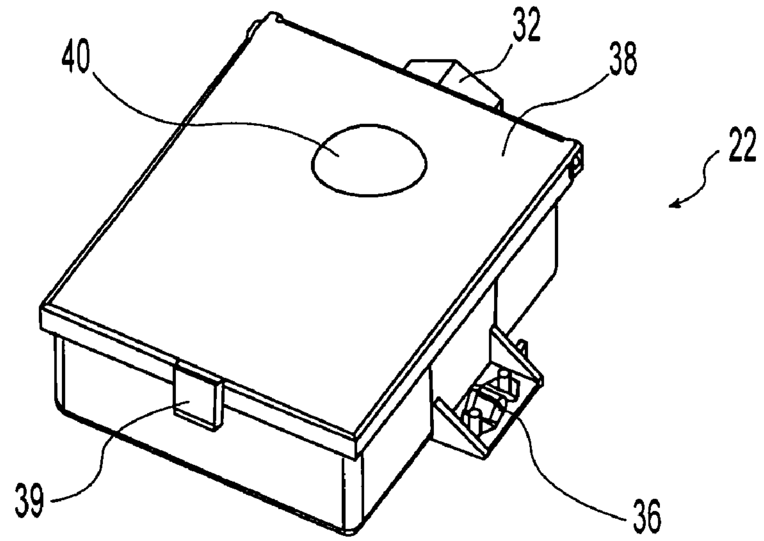
FIG. 3 is a perspective view of a portion of the housing assembly of FIG. 1, further illustrating a cover for the interface module.

As shown in FIGS. 2 and 3, interface box 22 includes side wall 31 with aperture 33. Aperture 33 accommodates passage of coupling 32 for connecting to an external electrical connection. Printed circuit board (PCB) 34 is provided in interface box 22 and includes pin connector 35 for connecting to pin connector 25 on housing 24 (FIG. 1). Pin connector 35 may be a high-density 44-pin D-subminiature connector. Advantageously, including PCB 34 in interface box 22 allows all wiring to be completed in assembly 20 prior to connection of camera 26. All signal and power wiring for assembly 20 enters interface box 22 via coupling 32. Alternatively, coupling 32 may be disposed in an aperture in cover 38 (FIG. 3).

Plug 40 (FIG. 1) seals the aperture in cover 38 when not in use. Plug 40 may be rubberized or comprise any other suitable sealant material. Similarly, a plug (not shown) may seal aperture 33 when not in use. Cover 38 of interface box 22 may be snapped closed via engagement of clip 39 with protrusion 37. Ball stud retainers 36 may be provided with interface box 22 to ensure easy connect and disconnect to housing 24. Retainers 36 (only one of which is shown in FIGS. 2 and 3) may be disposed on opposite sides of interface box 22 and engage with ball studs 41 (FIG. 1) to secure interface box 22 to housing 24.

Figure 5:
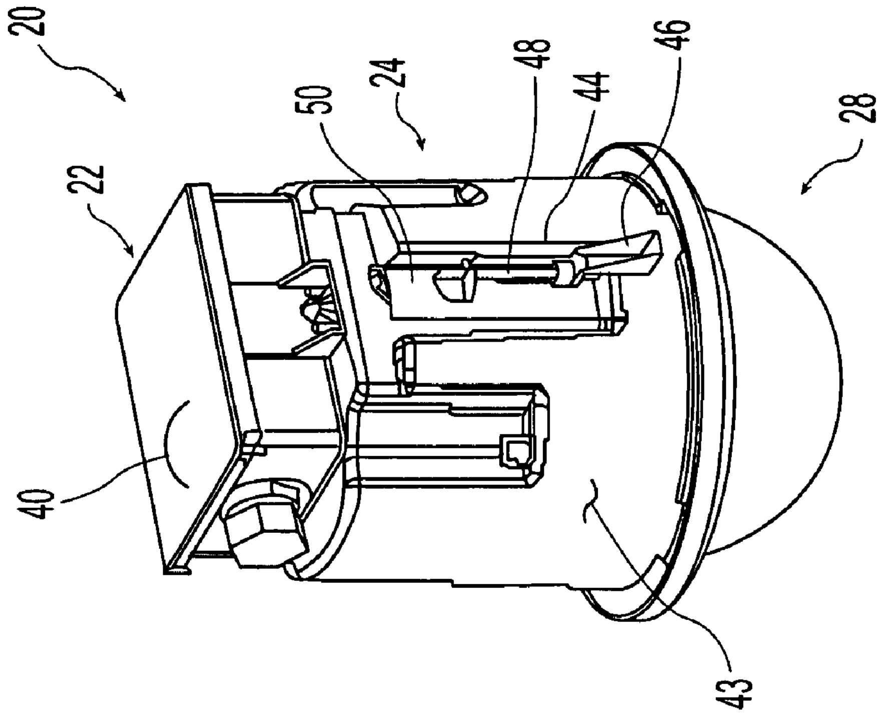
FIG. 5 is a perspective view of the housing assembly of FIG. 1, further illustrating the clamping mechanism rotated away from the housing and lowered toward the window assembly.
Figure 4:
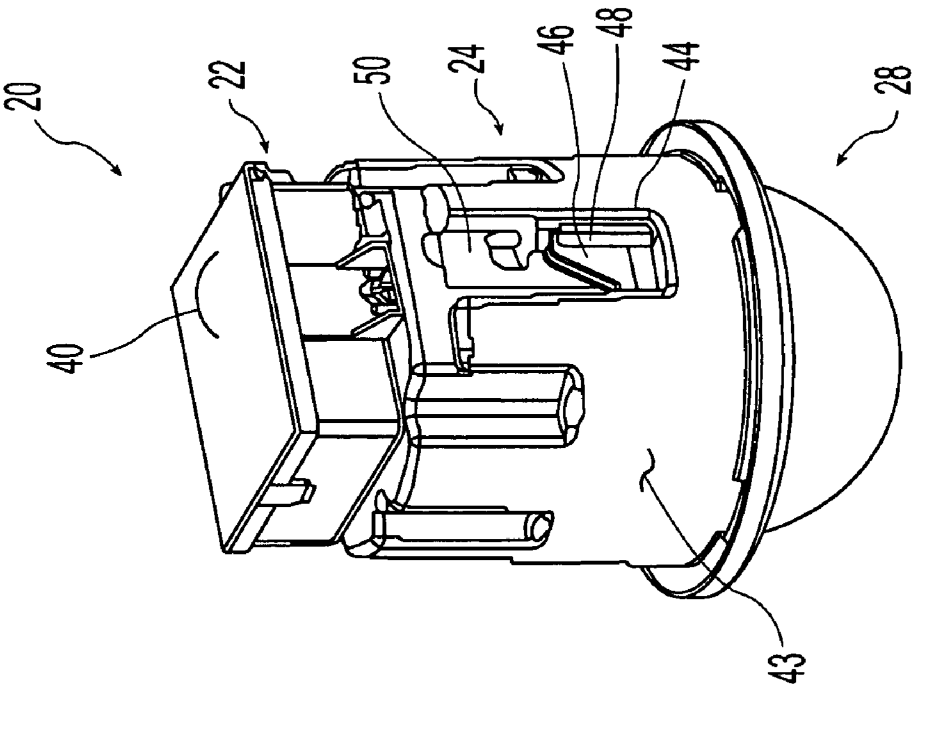
FIG. 4 is a perspective view of the housing assembly of FIG. 1, further illustrating the clamping mechanism retracted within a groove of the housing.
Figure 10:
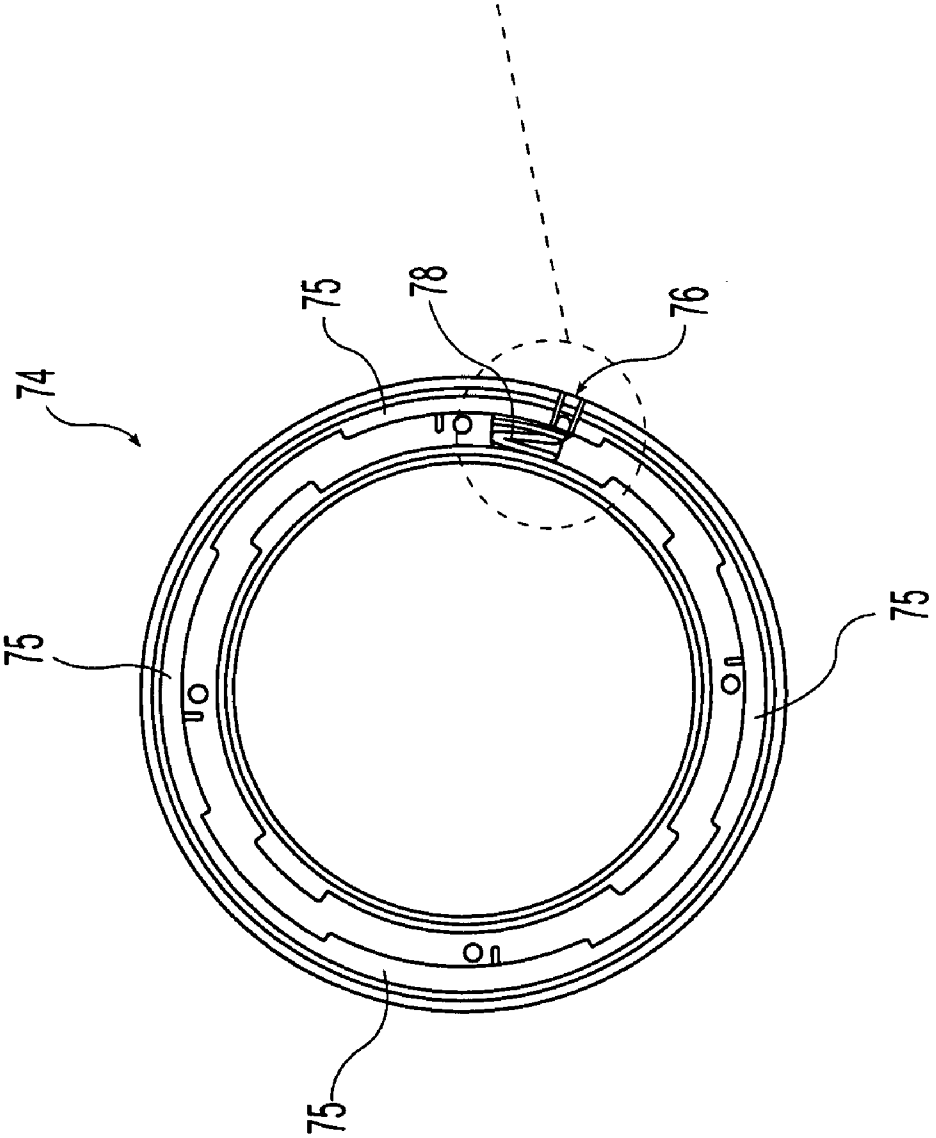
FIG. 10 is a top plan view of a window and trim ring assembly.
Figure 13:
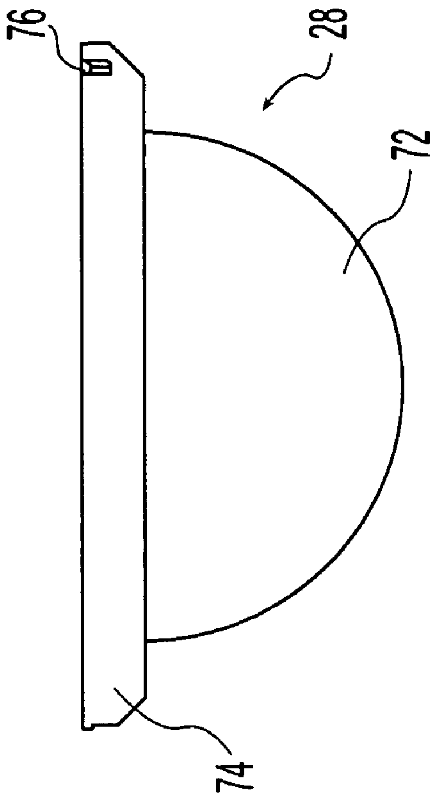
FIG. 13 is a side plan view of the window and trim ring assembly.
Figure 12:
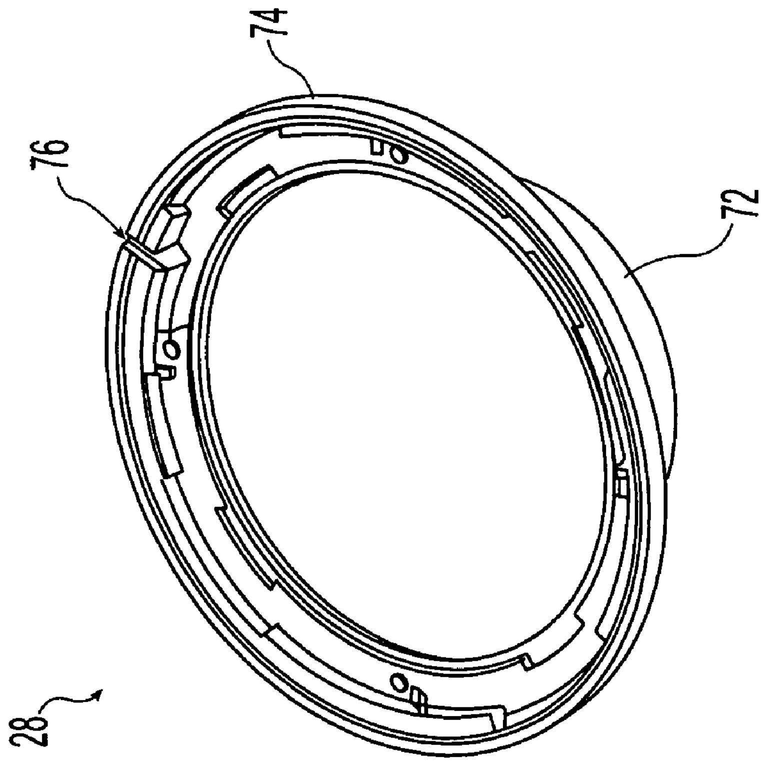
FIG. 12 is a perspective view of the window and trim ring assembly.

Referring now to FIGS. 4 and 5, interface box 22 is shown assembled to housing 24. Also assembled to housing 24 is camera 26 (FIG. 1) and window assembly 28, the assembly of which is described below. Housing 24 includes outer surface 43 having recess 44 formed therein. Housing 24 may have two recesses 44 (only one of which is shown in FIGS. 4 and 5) which are disposed diametrically opposite from one another. Housing 24 may include more than two recesses 44 depending on the particular application. Bracket 50 is located within recess 44 formed in housing 24 and secured thereto via a suitable fastener. As shown in FIG. 1, housing 24 also includes a plurality of radially outwardly extending flanges 29 and 30 for interconnection with flanges 75 (FIG. 10) of window assembly 28.

Referring now to FIGS. 4, 5, 7, and 8, bracket 50 may include first portion 52 and second portion 54. Second portion 54 has a width which fits within the width of recess 44. Similarly, first portion 52 has a width which fits within the depth of recess 44. The widths of first portion 52 and second portion 54 ensure that bracket 50 remains inside the circumference defined by outer surface 43. Bracket 50 also includes guide slot 51 which extends from first portion 52 to second portion 54. Thus, guide slot 51 is non-linear and non-planar because it extends into two substantially orthogonal planes defined by first portion 52 and second portion 54. Guide slot 51 is configured for camming action of follower pin 66 (FIG. 9) as pin 66 moves from first portion 52 to second portion 54, or vice versa. In an exemplary embodiment, guide slot 51 has a slight angle a as slot 51 translates from first portion 52 towards second portion 54. Angle $\alpha$ may be approximately 19° for optimal camming action. Guide slot 51 is sized to accept follower pin 66 (FIG. 9) of clamp 46. Bracket 50 also includes apertures 56 and 58 disposed generally coaxially with each other to accept drive member 48 therethrough and provide a guide structure for drive member 48 during operation.

Figure 6:
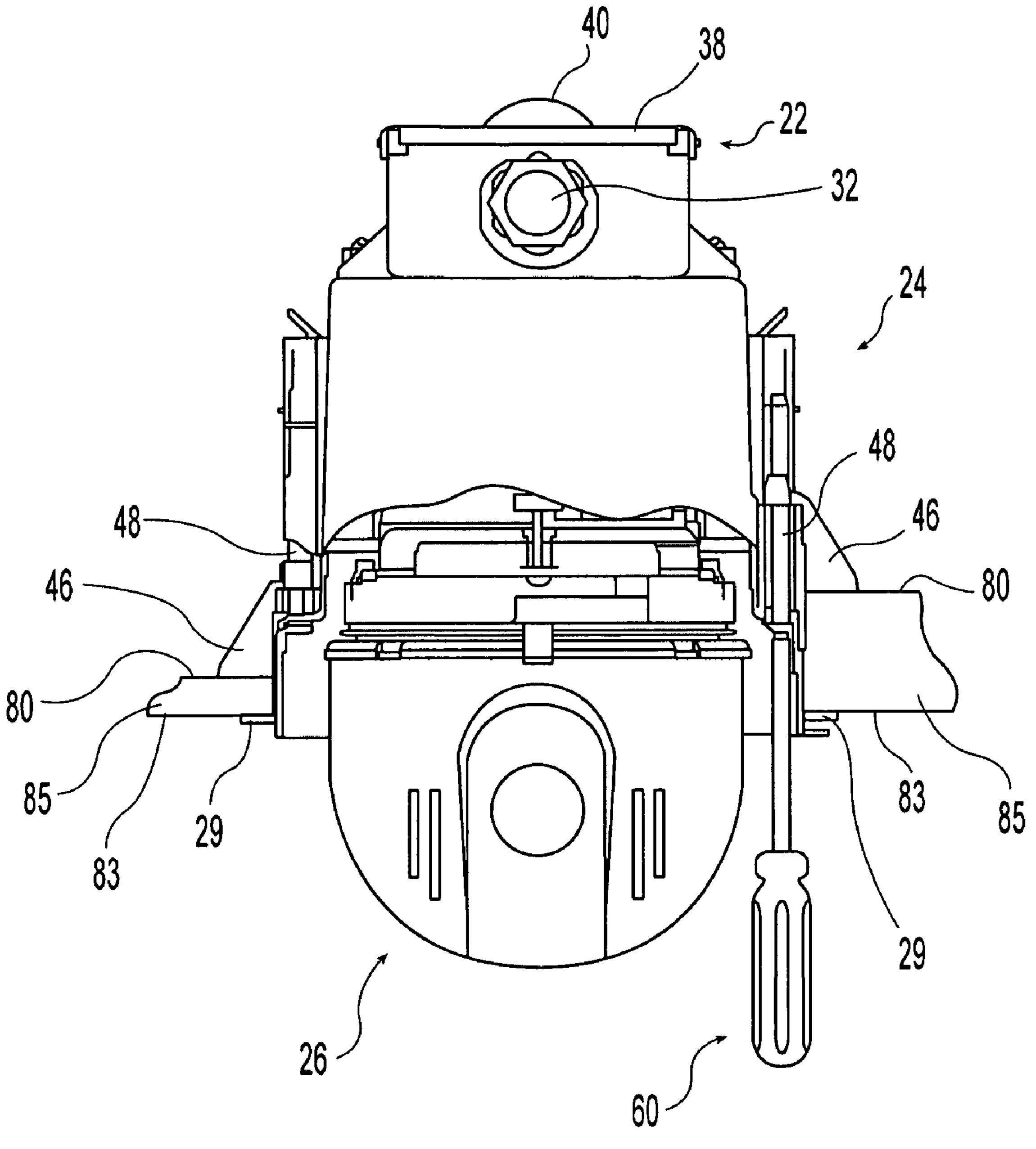
FIG. 6 is a partial cross-sectional view of the housing assembly of FIG. 1, further illustrating a driver tool to rotate a drive member of the clamping mechanism.
Figure 9:
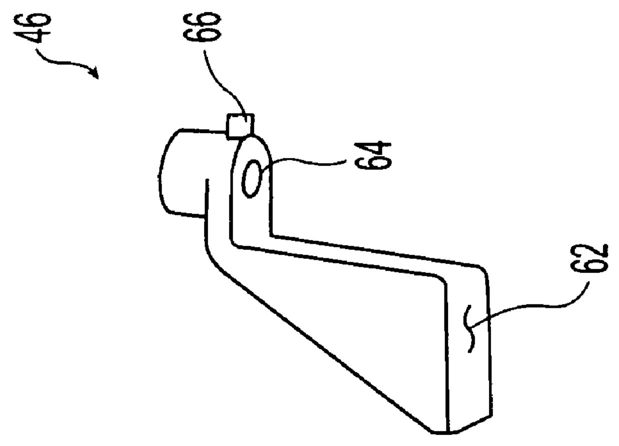
FIG. 9 is a perspective view of a clamp of the clamping mechanism.
Figure 8:
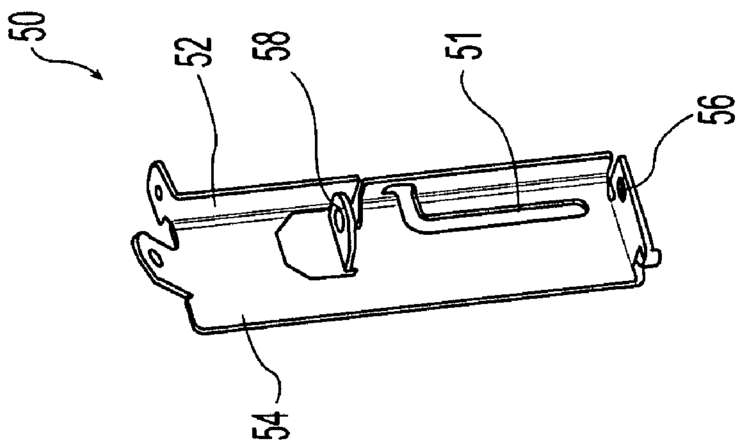
FIG. 8 is another perspective view of the bracket of the clamping mechanism.
Figure 7:
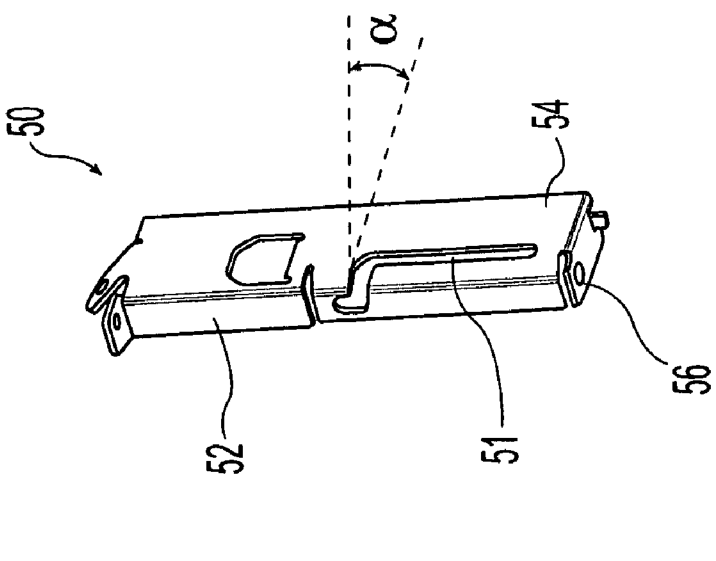
FIG. 7 is a perspective view of a bracket of the clamping mechanism.
Figure 11:
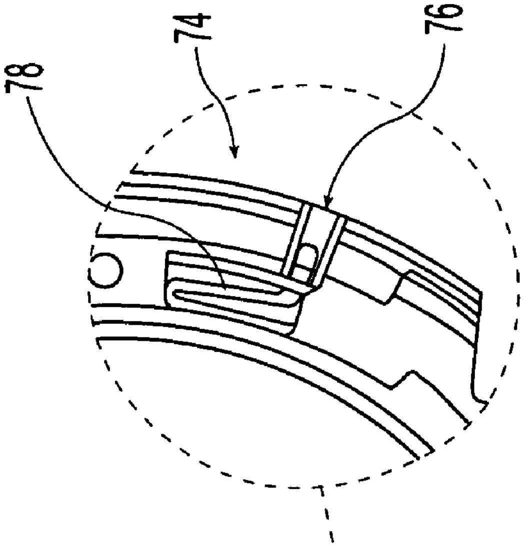
FIG. 11 is a close-up plan view of a portion of the window and trim ring assembly of FIG. 10.

Referring now to FIGS. 6 and 9, clamp 46 generally includes ceiling engagement surface 62 which lies adjacent to top ceiling surface 80 (FIG. 6) when fully tightened thereto. Clamp 46 includes aperture 64 which may be threaded to accommodate passage of drive member 48. In one embodiment, drive member 48 includes a threaded portion and a head for engaging with tool 60 for rotation thereof. Clamp 46 also includes follower pin 66 sized to engage with guide slot 51 of bracket 50.

Referring now to FIGS. 10-13, window assembly 28 is shown and includes window 72 attached to trim ring 74. Window assembly 28 advantageously conceals drive member 48 once window assembly 28 is assembled to housing 24. Trim ring 74 includes a plurality of inwardly radially extending flanges 75 to cooperate with flanges 29 and 30 (FIG. 1) of housing 24. Trim ring 74 also includes access slot 76 at the outside circumference thereof and retaining mechanism 78 aligned with access slot 76. Retaining mechanism 78 may be a spring-loaded snap mechanism which is biased into engagement with access slot 76. A special tool may be used to bias retaining mechanism 78 out of engagement with access slot 76, as will be described below.

In operation, camera 26 is inserted into housing 24 and secured thereto via secure mechanical and electrical connections. Camera 26 receives electrical communication via connection of camera pin connector 27 with pin connector 25 in housing 24. Pin connector 27 maintains signal continuity with pin connector 25 via three intermediate connections in removable modules within housing 24. Interface box 22 is then assembled to housing 24 via engagement of ball studs 41 on housing 24 with retainer 36 on interface box 22. The assembly consisting of interface box 22, housing 24, and camera 26 is then inserted into a ceiling structure 85 (FIG. 6) through an access hole provided therein. Ceiling structure 85 may include a plastered ceiling structure, a drywall ceiling structure, a drop ceiling structure, or any other ceiling structure accommodating assembly 20. Once flanges 29 contact bottom ceiling surface 83 of ceiling structure 85, tool 60 may be used to rotate drive member 48. Clockwise rotation of drive member 48, when viewed from bottom ceiling surface 83, causes clamp 46 to be translated through guide slot 51. Specifically, the threaded engagement of drive member 48 with clamp 46 via threaded aperture 64 initially causes follower pin 66 to begin movement along guide slot 51. Clamp 46, when housing 24 is initially inserted into ceiling structure 85, has the configuration relative to housing 24 as shown in FIG. 4. Upon initial clockwise rotation of tool 60, follower pin 66 follows guide slot 51. The non-planar configuration of guide slot 51 first causes clamp 46 to swing or pivot away from housing 24 into the configuration generally shown in FIG. 5. Once pivoted away from housing 24, clamp 46 is further translated toward ceiling structure 85 by rotating drive member 48 via tool 60 in the clockwise direction. Tool 60 rotates drive member 48 until ceiling engagement surface 62 of clamp 46 contacts top ceiling surface 80 of ceiling structure 85. The identical procedure can be done on any other clamp 46 included in assembly 20. Advantageously, when equipped with multiple clamping mechanisms, assembly 20 may be secured to a ceiling structure 85 which has varying thicknesses.

Once ceiling engagement surfaces 62 of clamps 46 are in contact with top ceiling surface 80 of ceiling structure 85 such that housing 24 is secured to ceiling structure 85, tool 60 is first removed from engagement with drive member 48 and clamps 46 cannot move relative to ceiling structure 85. Window assembly 28 may then be assembled to housing 24. Inwardly extending flanges 75 of trim ring 74 are aligned with outwardly extending flanges 29 of housing 24 and window assembly 28 is forced into contact with housing 24. A slight rotation of window assembly 28 causes inwardly extending flanges 75 of trim ring 74 to engage with outwardly extending flanges 30 of housing 24 to prevent relative translational movement between housing 24 and window assembly 28. Window assembly 28 is rotated slightly further in the same direction until retaining mechanism 78 snaps into engagement with locking slot 77 (FIG. 1) of housing 24, thereby preventing any further rotation of window assembly 28 relative to housing 24. Advantageously, window assembly 28 cannot be easily removed from housing 24 without the use of a special tool. Access to drive members 48 and, thus, clamps 46 is thereby prevented and substantially eliminates access to housing 24 by unauthorized persons.

If a need arises to replace or repair camera 26, an authorized person may gain access to housing 24 with the following procedure. Using a special tool (not shown), the person inserts the tool into access slot 76 in trim ring 74 and forces retaining mechanism 78 inwardly away from locking slot 77 of housing 24. Simultaneously, the person must rotate window assembly 28 to prevent retaining mechanism 78 from returning to engagement with locking slot 77 of housing 24. Once retaining mechanism 78 is out of engagement with locking slot 77, window assembly 28 may be rotated relative to housing 24. The person must rotate window assembly 28 until inwardly extending flanges 75 of trim ring 74 substantially align with outwardly extending flanges 29 of housing 24. The person may then translate window assembly 28 away from housing 24 to gain access to the interior thereof and any components contained therein.

If the person also needs to remove the entire assembly 20 from ceiling structure 85, the person may easily do so by using tool 60 and rotating each drive member 48 in a counterclockwise direction. Such rotation of drive member 48 causes clamp 46 to translate away from ceiling structure 85. Further rotation of drive member 48 in the counterclockwise direction eventually forces follower pin 66 of clamp 46 to follow guide slot 51 from second portion 54 into first portion 52. Movement of follower pin 66 in guide slot 51 towards first portion 52 causes clamp 46 to pivot towards housing 24 and retract completely within recess 44 of housing 24. Such retraction allows the person to then remove assembly 20 from ceiling structure 85 without any damage to the surrounding surfaces of ceiling structure 85 adjacent the access hole for assembly 20.

While this invention has been described as having an exemplary design, the present invention may be further modified within the spirit and scope of this disclosure. This application is therefore intended to cover any variations, uses, or adaptations of the invention using its general principles.

What is claimed is:

1. A clamping mechanism for securing a surveillance camera housing assembly to a ceiling structure, the surveillance camera housing assembly including a housing, the clamping mechanism comprising:

a bracket, said bracket attached to the housing, said bracket including a guide slot;

a clamp, said clamp including a follower pin, said follower pin engageable with said guide slot; and a rotatable drive member movable relative to the clamp, said drive member engaged with said clamp, whereby upon rotation of said drive member, said follower pin of said clamp follows said guide slot of said bracket.

2. The clamping mechanism of claim 1, wherein said guide slot comprises a non-linear slot.

3. The clamping mechanism of claim 1, wherein the housing includes an outer surface, said outer surface including a recess, said bracket substantially entirely disposed within said recess.

4. The clamping mechanism of claim 1, wherein said bracket includes a first portion and a second portion, said second portion substantially perpendicular to said first portion, said guide slot including first and second ends, said first end disposed in said first portion of said bracket, said second end disposed in said second portion of said bracket.

5. The clamping mechanism of claim 1, wherein said clamp includes an engagement surface, wherein upon rotation of said drive member, said follower pin of said clamp follows said guide slot of said bracket until said engagement surface contacts the ceiling structure.

6. The clamping mechanism of claim 1, wherein said clamp includes a threaded aperture, said threaded aperture engageable with said drive member.

7. The clamping mechanism of claim 1, wherein said bracket includes a guide structure engageable with said drive member.

8. The clamping mechanism of claim 1, wherein rotation of the drive member in a first direction initially causes the clamp to pivot away from the recess of the housing, and further rotation of the drive member in the first direction translates the clamp toward the ceiling structure.

9. The clamping mechanism of claim 4, wherein said guide slot includes a camming angle of approximately 19°.

10. The clamping mechanism of claim 8, wherein rotation of the drive member in a second direction, opposite to the first direction, translates the clamp away from the ceiling structure, and wherein further rotation of the drive member in the second direction retracts the clamp to a position within the recess of the housing.

11. A surveillance camera housing assembly for mounting in a ceiling structure, comprising:

a housing including a clamping mechanism, said clamping mechanism comprising:

a bracket, said bracket attached to said housing, said bracket including a guide slot;

a clamp, said clamp including a follower pin, said follower pin engageable with said guide slot; and a rotatable drive member movable relative to the clamp, said drive member engaged with said clamp, whereby upon rotation of said drive member, said follower pin of said clamp follows said guide slot of said bracket;

a camera, said camera removably connected to said housing; and a window assembly removably connected to said housing.

12. The surveillance camera housing assembly of claim 11, wherein said housing includes a plurality of flanges extending radially outward, said window assembly includes a plurality of flanges extending radially inward which are engageable with said plurality of flanges of said housing, whereby rotating said window assembly onto said housing secures said window assembly to said housing.

13. The surveillance camera housing assembly of claim 11, wherein said housing includes an outer surface, said outer surface including a recess, said bracket substantially entirely disposed within said recess.

14. The surveillance camera housing assembly of claim 11, wherein said guide slot comprises a non-linear slot.

15. The surveillance camera housing assembly of claim 11, wherein said bracket includes a first portion and a second portion, said second portion substantially perpendicular to said first portion, said guide slot including first and second ends, said first end disposed in said first portion of said bracket, said second end disposed in said second portion of said bracket.

16. The surveillance camera housing assembly of claim 11, wherein said clamp includes an engagement surface, wherein upon rotation of said drive member, said follower pin of said clamp follows said guide slot of said bracket until said engagement surface contacts the ceiling structure.

17. The surveillance camera housing assembly of claim 11, wherein said clamp includes a threaded aperture, said threaded aperture engageable with said drive member.

18. The surveillance camera housing assembly of claim 11, wherein said bracket includes a guide structure engageable with said drive member.

19. The surveillance camera housing assembly of claim 11, wherein rotation of the drive member in a first direction initially causes the clamp to pivot away from the recess of the housing, and further rotation of the drive member in the first direction translates the clamp toward the ceiling structure.

20. The surveillance camera housing assembly of claim 12, wherein said window assembly further includes removal prevention means for preventing unauthorized removal of said window assembly.

21. The clamping mechanism of claim 15, wherein said guide slot includes a camming angle of approximately 19°.

22. The surveillance camera housing assembly of claim 19, wherein rotation of the drive member in a second direction, opposite to the first direction, translates the clamp away from the ceiling structure, and wherein further rotation of the drive member in the second direction retracts the clamp to a position within the recess of the housing.

23. A method for installing a surveillance camera housing assembly to a ceiling structure, comprising the steps of:

inserting a housing with attached clamping mechanism into the ceiling structure, the clamping mechanism comprising:

a bracket, the bracket attached to the housing, the bracket including a guide slot;

a clamp, the clamp including a follower pin, the follower pin engageable with the guide slot; and a rotatable drive member, the drive member engaged with the clamp, whereby upon rotation of the drive member, the follower pin of the clamp follows the guide slot of the bracket;

rotating the drive member in a first direction until the clamp engages the ceiling structure; and connecting a window assembly to the housing.

24. The method of claim 23, wherein the clamp is initially substantially entirely recessed within an outer surface of the housing and rotating the drive member in the first direction causes the clamp to pivot away from the recess of the housing.

25. The method of claim 24, wherein additional rotation of the drive member in the first direction translates the clamp toward the ceiling structure.

26. The method of claim 25, further comprising the step of rotating the drive member in a second direction, the second direction opposite to the first direction, said rotating the drive member in the second direction translates the clamp away from the ceiling structure.

27. The method of claim 26, wherein further rotation of the drive member in the second direction substantially entirely retracts the clamp within the recess of the housing.

* * * * *

UNITED STATES PATENT AND TRADEMARK OFFICE

CERTIFICATE OF CORRECTION

PATENT NO. : 7,621,680 B2
APPLICATION NO. : 11/295093
DATED : November 24, 2009
INVENTOR(S) : Frick et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 578 days.

Signed and Sealed this

Fourteenth Day of December, 2010

David J. Kappos
*Director of the United States Patent and Trademark Office*